United States Patent
Knott et al.

(10) Patent No.: US 8,921,437 B2
(45) Date of Patent: Dec. 30, 2014

(54) POLYMERIC MATERIALS AND ALSO ADHESIVE AND COATING COMPOSITIONS COMPOSED THEREOF AND BASED ON MULTI-ALKOXYSILYL-FUNCTIONAL PREPOLYMERS

(75) Inventors: Wilfried Knott, Essen (DE); Frank Schubert, Neukirchen-Vluyn (DE); Martin Glos, Borken (DE); Carsten Schiller, Muelheim an der Ruhr (DE); Matthias Naumann, Greensboro, NC (US)

(73) Assignee: Evonik Goldschmidt GmbH, Essen (DE)

( * ) Notice: Subject to any disclaimer, the term of this patent is extended or adjusted under 35 U.S.C. 154(b) by 461 days.

(21) Appl. No.: 12/561,599

(22) Filed: Sep. 17, 2009

(65) Prior Publication Data
US 2010/0071849 A1 Mar. 25, 2010

(30) Foreign Application Priority Data

Sep. 24, 2008 (DE) .......................... 10 2008 042 310
Oct. 28, 2008 (DE) .......................... 10 2008 043 218

(51) Int. Cl.
C08G 77/08 (2006.01)
C09J 5/08 (2006.01)
C08G 65/336 (2006.01)
C08L 71/02 (2006.01)
C09J 171/02 (2006.01)

(52) U.S. Cl.
CPC ................. *C09J 5/08* (2013.01); *C08G 65/336* (2013.01); *C08L 71/02* (2013.01); *C09J 171/02* (2013.01)

USPC ................. 521/154; 528/14; 528/17; 528/18; 528/19; 528/21; 528/29; 528/40; 156/329; 156/78; 156/79; 428/447

(58) Field of Classification Search
USPC .............. 528/14, 17, 18, 21, 29, 40; 521/154; 428/447; 156/329, 78, 79
See application file for complete search history.

(56) References Cited

U.S. PATENT DOCUMENTS

| | | | | |
|---|---|---|---|---|
| 3,388,079 | A * | 6/1968 | Vandenberg | 528/27 |
| 3,538,043 | A * | 11/1970 | Herold | 525/449 |
| 4,456,704 | A * | 6/1984 | Fukumura et al. | 521/79 |
| 5,430,166 | A | 7/1995 | Klein et al. | |
| 5,475,127 | A | 12/1995 | Klein et al. | |
| 6,291,622 | B1 | 9/2001 | Droese et al. | |
| 6,307,082 | B1 | 10/2001 | Klein et al. | |
| 6,503,995 | B2 * | 1/2003 | Tsuji et al. | 528/31 |
| 6,503,997 | B1 * | 1/2003 | Saito et al. | 528/61 |
| 6,569,980 | B1 * | 5/2003 | Masaoka et al. | 528/27 |
| 6,649,016 | B2 * | 11/2003 | Wu et al. | 156/329 |
| 6,858,663 | B2 | 2/2005 | Knott et al. | |

(Continued)

FOREIGN PATENT DOCUMENTS

| | | |
|---|---|---|
| CA | 2 654 773 | 8/2009 |
| EP | 0 372 561 | 6/1990 |

(Continued)

*Primary Examiner* — Margaret Moore
(74) *Attorney, Agent, or Firm* — Frommer Lawrence & Haug LLP

(57) ABSTRACT

Prepolymers having more than one alkoxysilyl function per chain end reactive towards epoxide groups as a constituent of curable compositions, and their use for producing adhesive-bonding and coating compositions, which may also be foamable, and also polymeric materials produced therefrom.

14 Claims, 1 Drawing Sheet

Structure of the formula (1)

formula (1)

(56) References Cited

U.S. PATENT DOCUMENTS

| | | |
|---|---|---|
| 7,018,458 B2 | 3/2006 | Knott et al. |
| 7,125,585 B2 | 10/2006 | Dudzik et al. |
| 7,157,541 B2 | 1/2007 | Knott et al. |
| 7,196,153 B2 | 3/2007 | Burkhart et al. |
| 2003/0023949 A1 | 1/2003 | Hagmeier et al. |
| 2004/0132951 A1 | 7/2004 | Burkhart et al. |
| 2006/0040108 A1* | 2/2006 | Wang et al. .......... 428/413 |
| 2006/0155089 A1 | 7/2006 | Ferenz et al. |
| 2006/0241270 A1 | 10/2006 | Burkhart et al. |
| 2007/0043193 A1 | 2/2007 | Henning et al. |
| 2007/0049717 A1 | 3/2007 | Knott et al. |
| 2007/0093565 A1 | 4/2007 | Glos et al. |
| 2007/0100083 A1* | 5/2007 | Arakawa et al. .......... 525/342 |
| 2007/0128143 A1 | 6/2007 | Gruening et al. |
| 2008/0064782 A1 | 3/2008 | Dohler et al. |
| 2008/0125503 A1 | 5/2008 | Henning et al. |
| 2008/0146688 A1 | 6/2008 | Glos et al. |
| 2008/0153934 A1 | 6/2008 | Knott et al. |
| 2008/0153992 A1 | 6/2008 | Knott et al. |
| 2008/0153995 A1 | 6/2008 | Knott et al. |
| 2009/0030097 A1 | 1/2009 | Knott et al. |
| 2009/0043001 A1 | 2/2009 | Brueckner et al. |
| 2009/0088488 A1 | 4/2009 | Brueckner et al. |
| 2009/0137751 A1 | 5/2009 | Knott et al. |
| 2009/0137752 A1 | 5/2009 | Knott et al. |
| 2009/0149573 A1 | 6/2009 | Venzmer et al. |
| 2010/0036011 A1 | 2/2010 | De Gans et al. |
| 2010/0041910 A1 | 2/2010 | Schubert et al. |
| 2010/0056649 A1 | 3/2010 | Henning et al. |
| 2010/0081781 A1 | 4/2010 | Schubert et al. |
| 2010/0105843 A1 | 4/2010 | Knott et al. |
| 2010/0113633 A1 | 5/2010 | Henning et al. |

FOREIGN PATENT DOCUMENTS

| | | |
|---|---|---|
| EP | 1 285 946 | 2/2003 |
| EP | 1 964 878 | 9/2008 |
| EP | 2 093 244 | 8/2009 |

\* cited by examiner

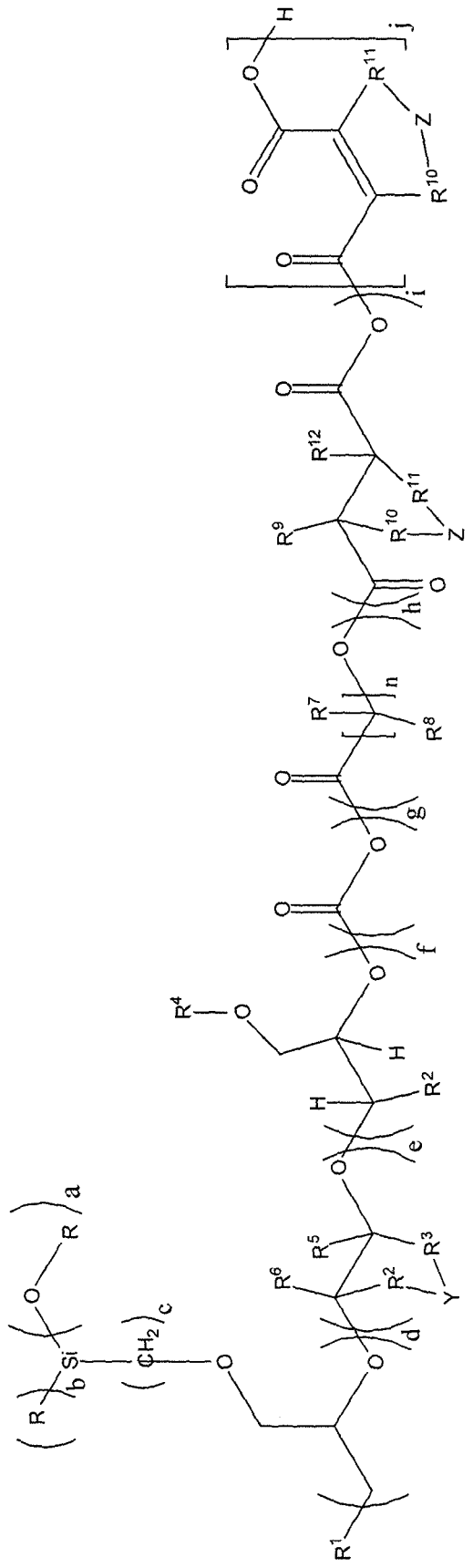

POLYMERIC MATERIALS AND ALSO ADHESIVE AND COATING COMPOSITIONS COMPOSED THEREOF AND BASED ON MULTI-ALKOXYSILYL-FUNCTIONAL PREPOLYMERS

This application claims benefit under 35 U.S.C. 119(a) of German patent application DE 10 2008 042 310.6, filed on Sep. 24, 2008 and DE 10 2008 043 218.0 filed on Oct. 28, 2008.

Any foregoing applications including German patent applications DE 10 2008 042 310.6 and DE 10 2008 043 218.0, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to alkoxysilane-functional prepolymers and to a method of adhesive bonding or coating of surfaces with an optionally foamable mixture comprising these alkoxysilane-functional prepolymers.

Within the field of the adhesive bonding or coating of substantially two-dimensional structures, diverse efforts have been made to obtain systems with controlled setting which exhibit an optimized hardness/setting behaviour as a function of the field of application.

The isocyanate-based systems which form polyurethanes and are then utilized for the bonding/coating of surfaces have fallen into disrepute on account of the toxicological objectionability of the isocyanates and for the same reason have in some cases to be replaced.

A variety of routes have been proposed in response to this.

In some cases the isocyanate group is protected and is reacted in situ only during crosslinking/polymerization, by utilization of allophanate structures or biuret structures; in other cases, innovative adhesive-bonding and coating compositions are utilized which are entirely free from isocyanates or else at least partly replace such isocyanates.

Interestingly, it has been possible in the context of the present invention to develop what are in fact innovative prepolymers which carry alkoxysilyl groups and which not only are reactive towards polyols but can also be reacted with the isocyanate-based systems and their successor systems based on biuret or allophanate structures, and which therefore are helping to conquer new, diverse fields of application which controllably, in a balanced way, allow desired adhesive bonds or coatings.

Prepolymer systems which possess reactive alkoxysilyl groups are well established and are very often used for producing elastic sealants and adhesives in the industrial and construction sectors. In the presence of atmospheric moisture and suitable catalysts, these alkoxysilane-terminated prepolymers are capable even at room temperature of undergoing condensation with one another to eliminate the alkoxy groups and form an Si—O—Si bond. Accordingly the possible uses of these prepolymers include their use as one-component systems, which possess the advantage of ease of handling, since there is no need to meter out and mix in a second component.

Likewise well-established are alkoxysilane-functional polyurethanes which crosslink via silane polycondensation. A review article on this topic is found in, for example, "Adhesives Age" 4/1995, page 30 ff. (Authors: Ta-Min Feng, B. A. Waldmann). Alkoxysilane-terminated, moisture-curing, one-component polyurethanes of this kind are being used increasingly as flexible coating, sealing and adhesive-bonding compounds in construction and in the automotive industry.

Alkoxysilane-functional polyurethanes of this kind can be prepared, in accordance with U.S. Pat. No. 3,627,722 or U.S. Pat. No. 3,632,557, by reacting, for example, polyether polyols with an excess of polyisocyanate to give an NCO-containing prepolymer, which is then further reacted in turn with an amino-functional alkoxysilane. The resulting alkoxysilane-functional prepolymer contains urea and urethane groups in a high concentration, leading to high viscosity of the products.

Allophanates are prepared in the art by reacting a monohydric or polyhydric alcohol with large amounts of excess aromatic, aliphatic and/or cycloaliphatic diisocyanate (cf. GB A 994 890, U.S. Pat. No. 3,769,318, EP A 0 000 194 (U.S. Pat. No. 4,160,080) or EP A 0 712 840 (U.S. Pat. No. 5,672,736)). Use is made here exclusively of diisocyanates or polyisocyanates, in order to obtain in due course an isocyanate-functional binder. To prevent premature crosslinking it is necessary to use an excess of polyisocyanate, which has to be removed, after urethanization and allophanatization have taken place, by means of vacuum distillation. With this approach, a further isocyanate group is linked as a functional group via the allophanate nitrogen. The fact that polyisocyanates having allophanate structures are of relatively low viscosity as compared with analogues without allophanate structures is described diversely in the literature, as for example in EP B 0 682 012 (U.S. Pat. No. 6,392,001). It is likewise possible to prepare allophanates indirectly, from isocyanate derivatives other than urethanes and isocyanates. For instance, EP A 0 825 211 (U.S. Pat. No. 5,917,083) describes a process for synthesizing allophanate structures from oxadiazinetriones; a further route is the opening of uretdiones (cf. the Proceedings of the International Waterborne, High-Solids, and Powder Coatings Symposium 2001, 28, 405-419 and also US-A-2003 0153713) to give allophanate structures. Both routes, however, require sophisticated starting materials and lead only to an allophanate product with a high by-product content. Additionally, when the precursors are being synthesized, the polyisocyanates used exclusively have a functionality of at least two. The use of monoisocyanates has also already been disclosed in connection with the allophanate chemistry. U.S. Pat. No. 5,663,272 and 5,567,793 use phenyl isocyanate, in order, after reaction with a polyfunctional alcohol, to obtain a urethane which is free of NCO groups and OH groups and which is subsequently modified by allophanatization with specific types of MDI to give a liquid MDI polyisocyanate. With this procedure the product prior to further processing comprises monomeric diisocyanate.

WO 2007/025667 (US 2007-0055010) describes further modified polyurethane prepolymers containing alkoxysilane groups, and are said to have a significantly reduced viscosity. Prepolymers of this kind with allophanate and/or biuret structures, at least 10 mol % of their allophanate and/or biuret structures being derived from a monoisocyanate of the general formula R—NCO, where R is an optionally heteroatom-containing alkyl, aralkyl or aryl radical having up to 20 C atoms and where these radicals contain no functionalities other than the NCO function—which is present as part of the allophanate structure—and any alkoxysilyl groups that may be present, can be prepared in a decidedly simple way, by reacting urethane groups and/or urea groups of a polyurethane prepolymer, which may contain alkoxysilane groups, with monoisocyanates in a partial or complete allophanatization and/or biuretization reaction of these groups. A disadvantage associated with these prepolymers, however, is the relatively low functionalization density which is provided for the crosslinking.

Understandably, the reactivity of the capped isocyanates with a biuret or allophanate structure is significantly lower than by comparison with that of the free isocyanates, but can be optimized for the application by addition of suitable catalysts.

Conversely a further advantage of alkoxysilane-functional prepolymers lies in the fact that their curing releases neither acids nor oximes nor amines. Moreover, in contrast to what is the case with isocyanate-based sealants or adhesives, no gaseous $CO_2$ is produced, whose formation would cause further, subsequent expansion of the adhesive after the bonding of structural parts. Furthermore, unlike isocyanate-based systems, alkoxysilane-functional prepolymer mixtures are toxicologically unobjectionable.

One particularly advantageous type of alkoxysilane-functional prepolymers comprises alkoxysilane-terminated prepolymers. These may be synthesized from different building blocks. Customarily these prepolymers possess an organic backbone, i.e. they are constructed, for example, from polyurethanes, polyethers, polyesters, polyacrylates, polyvinyl esters, ethylene-olefin copolymers, styrene-butadiene copolymers or polyolefins, described in references including EP 0 372 561 (U.S. Pat. No. 5,068,304), WO 00/37533 (U.S. Pat. No. 6,124,387) or U.S. Pat. No. 6,207,766. Besides these, however, there are also systems in widespread use whose backbone is composed entirely or at least partly of organosiloxanes, described in sources including WO 96/34030 (U.S. Pat. No. 6,441,118).

In one particularly advantageous preparation process for alkoxysilane-terminated prepolymers the starting materials are polyols, such as polyether or polyester polyols, for example, which in a first reaction step are reacted with an excess of a di- or polyisocyanate.

Subsequently, the isocyanate-terminated prepolymers obtained in this first step are reacted with aminoalkyl-functional alkoxysilanes to give the desired alkoxysilane-terminated prepolymer. One alternative option is to prepare alkoxysilane-terminated prepolymers by reacting a polyol or an OH-functional polyurethane, of the kind preparable by reacting polyols with a substoichiometric amount of di- or polyisocyanates, with an isocyanatoalkyl-functional alkoxysilane. These preparation processes are described in EP 1 421 129 (U.S. Pat. No. 7,153,923) or WO 2005/000931 (US 2007-0100111) for example. There are further preparation processes conceivable as well, an example being the reaction of amino-functional polyols with carbamatoalkyl-alkoxysilanes, as is described in WO 02/034838 (US 2005-260401).

Also known, furthermore, are alkoxysilane-functional prepolymers having a poly(meth)acrylate backbone. These prepolymers are synthesized typically by copolymerizing (meth)acryloyloxyalkylalkoxysilanes with other (meth)acrylic monomers and/or with further unsaturated monomer building blocks, such as styrene, for example.

It is also possible, moreover, to prepare alkoxysilane-functional polymers by subsequent grafting of unsaturated alkoxysilanes, such as of vinylsilanes or (meth)acrylosilanes, for example.

As well as their use as adhesives, the use of alkoxysilane-functional prepolymers for producing silane-crosslinking rigid and flexible foams is known, particularly isocyanate-free sprayable in situ foams, and is described for example in EP 1 098 920 B1 or EP 1 363 960 B1 (US 2004-0072921).

These spray foams are applied typically from pressurized cans and serve primarily to seal window joints, as filling and strengthening material for doorframes, or generally for filling and sealing of cavities in the built structure. In accordance with these applications, the foams feature an extremely low density, i.e. a maximum volume yield per foam can and hence a maximum productivity. The low foam densities are achieved through the addition of a maximum amount of physical blowing agents (i.e. gases which are liquefied under pressure in the foam can and which drive the formation of foam in the spraying operation).

Spray foams of this type are unsuited to use in conventional adhesive-bonding applications, principally because, after having foamed, they possess to start with no significant initial mechanical properties, and the workpieces to be bonded would therefore have to be fixed for extremely long periods of time.

DE 10 2006 054 155 (WO 2008-058955, EP 2092032) teaches a method of adhesively bonding surfaces that involves foaming a foamable mixture which comprises prepolymers having exclusively terminal and isolated alkoxysilyl groups and also a basic group in the molecule, such as $NH_2$, $NHR^3$, or $N(R^3)_2$ group, for example, and also comprises blowing agents, on one of the surfaces to be bonded or between the surfaces to be bonded to form a foam, or else applying the foam that can be produced from the mixture, after foaming has taken place, to one of the surfaces to be bonded or between the surfaces to be bonded, and then compressing the foam between the surfaces to be bonded.

The teaching of DE 10 2006 054 155 additionally envisages the addition of further free silanes as additional components, with the capacity to take on a number of functions, to the trialkoxysilyl units already represented in the copolymer structure, for the purpose of reinforcing the effect those units introduce. There is a discussion of the role of these additional silanes as water scavengers (improving storage stability), as crosslinkers and/or reactive diluents (raising the network density and thus improving the mechanical properties, such as the tensile strength, of the cured composition) and not least, preferably in the form of the alkoxysilanes, of their role as adhesion promoters.

The low molecular mass alkoxysilanes of DE 10 2006 054 155, i.e. alkoxysilanes which possess a basic group such as $NH_2$, $NHR^3$, or $N(R^3)_2$ group, are in fact accorded the pure function of curing catalysts or at least curing co-catalysts.

A disadvantage of the procedure described is the low functionalization density of the prepolymer terminated with silyl groups only in α, ω position. In view of the high molecular mass construction of the target polyurethane polymer, the silyl modification is modest, not to say inadequate, for effectively addressing the desired effect of good and permanent substrate adhesion.

Therefore, the teaching of DE 10 2006 054 155 refers to the option of adding free silanes to the PU matrix in order to bring about the desired effects discussed at the outset (adhesion promotion, drying, crosslinking and the like). This in no way ensures the targeted incorporation of silyl anchor groups at the points in the polymer that require their positive effect. The method depicted reveals defects, particularly with regard to the quality-assuring reproducibility.

There is therefore a need for a technically simple, reliable and in particular reproducible method.

Surprisingly, it has now been found that the technical restrictions and disadvantages set out here can be overcome by using as a copolymer component new polyether alcohols which carry alkoxysilyl groups, are obtainable by alkoxylation of epoxide-functional alkoxysilanes over double metal cyanide (DMC) catalysts, and are described in full in the as yet unpublished specification DE 10 2008 000360.3, which is hereby introduced in full as part and subject matter of this disclosure.

These new polyether structures, which may have not only alkoxysilane functions within the sequence of the oxyalkylene units of the polyether chain but also new multi-alkoxysilane functions in their termini, permit the density of anchor groups in the target prepolymer to be set as desired, i.e., to be adapted to the particular performance objective.

On the basis of their alkoxysilyl groups, which are sensitive to hydrolysis and have a tendency towards crosslinking, these innovative, reactive polyethers represent polymers which are already self-curable. Their crosslinking to give solid thermoset end products is accomplished in a simple way in the presence of water and, selectively, with the addition of acid or base as an accelerant, it being possible for the pot life to be controlled by raising the temperature during the curing operation. Consequently, the polymer structure of these crosslinkable polyethers can be varied multifariously in accordance with the nature of the starter and also with the nature, amount and sequence of the epoxide monomers that can be used, in order to tailor important performance product properties in this way, as a function of the particular end use envisaged. Thus, for example, by varying the fraction of alkoxysilane units in the polymer chain, it is possible to influence the crosslinking density and hence the mechanical and physicochemical properties profile of the cured polymers within wide limits. Surprisingly, here, even polyethers equipped with considerable alkoxysilyl functionalization density are readily manageable liquids at low viscosity, and so, even in the case where highly crosslinked readily adhering adhesive bonds are the target, there are no restrictions on the metering of this component. This observation differentiates the inventive teaching from the procedure set out in DE 10 2006 054 155, which is based on the introduction of free silane monomers as formulating constituents into the final formulas, in order to ensure that the required crosslinking density is achieved in conjunction with a low processing viscosity. The polyethers containing alkoxysilyl groups, that are virtually unlimited in their structural diversity, give the person skilled in the art of polymer chemistry, through the incorporation, for example, of ester, carbonate and aromatic structural elements, a design freedom which addresses virtually any performance requirements.

The polymers obtained by the method of the invention are suitable, for example, as base materials for the production of adhesives, for surface coating, as reactive crosslinkers, as adhesion promoters and primers and also as binders, for various substrates such as metals, glass and glass fibres/glass fabric, wood, wood-based materials, natural fibres, and also, for example, cork and silicatic materials in general. For instance, the targeted incorporation of the alkoxysilyl moieties, which are anchored to masonry, concrete, mortar, etc. via hydrolytic processes, proves to be extremely advantageous when systems thus equipped are employed in the sector of the construction industry, where tasks include the joining and insulating sealing of, for example, frames for windows and doors in the carcasses of buildings.

Since the innovative prepolymers harden without releasing gaseous reaction products, it is also possible to utilize them to coat surfaces in the form, for example, of a coating material or coating-material constituent. For instance, WO 2008/074489 describes coating compositions of high scratch resistance and weathering stability based on polyols and polyisocyanates with hydrolysable silane groups.

Additionally, as a result of the possibility of dispensing with free isocyanates, application can be expanded to include food-contact applications. The polymers of the invention can be used as binders, in other words for joining like or different materials to one another, in the production of wood-based materials, such as chipboard or MDF board, for example, the bonding of particles of wood or of cork (and also wood chips or wood fibres), and hence are also available for floors, including wood-block floors and laminate applications as a replacement for aminoplast resins or isocyanate adhesive compositions. The redistribution of the reactive groups from the silane group-modified polyisocyanate to the polyol, with simultaneous provision of multiple hydrolysable alkoxysilyl groups, leads to new adhesives and coating materials with a variably adjustable profile of properties. The polymers of the invention may also possess thermoplastic properties and hence be used for producing mouldings where a temperature-dependent flow behaviour is needed. The moulding compounds can be used in processes such as injection moulding, extruding or hot pressing, for example. The polymers of the invention can be employed preferably without catalysts, and so further crosslinking and curing do not take place during the shaping operation. After crosslinking has taken place, the silyl-bearing polymers undergo a transition to thermoset products.

The invention accordingly first provides curable prepolymers having more than 1 alkoxysilyl function per chain end reactive towards epoxide groups, as a constituent of compositions which can be used as adhesive-bonding, binding and/or coating materials.

The prepolymers of the invention are reaction products of a (silyl)polyol and an isocyanate with a —OH and/or a —NCO moiety. These prepolymers are characterized in that they are curable and do not already exhibit a polymer network and/or crosslinking of polymer units.

As the person skilled in the art is aware, the crosslinking or curing of alkoxysilyl groups takes place in a two-stage chemical process, in which in a first step, in the presence of water, for which atmospheric humidity may also suffice, the alkoxy groups attached to the silicon are eliminated as corresponding alcohols, and SiOH groups are formed. The latter then undergo condensation, in the case of self-condensation, with one another to form Si—O—Si bridges and form polymeric materials. Alternatively the SiOH-functional intermediates react with substrates containing reactive groups, as for example particularly well with silicatic surfaces which carry OH functions and lead to excellent chemical anchoring on the respective substrate. The curing rate can be influenced in a wide variety of ways by addition of catalysts or variation of temperature.

In this way it is possible to obtain polymeric materials, where appropriate with a foam-like structure, by inducing the known processes of free or catalytically induced curing of prepolymers. Through the variability and multiplicity of alkoxysilyl group modification it is possible to determine the preferred form in a manner compatible with the application.

The curable prepolymers preferably contain more than one alkoxysilyl function, preferably more than one tri-alkoxysilyl function, per chain end reactive towards epoxide groups.

The prepolymers which can be used in accordance with the invention, especially the alkoxysilyl-modified polyetherols of the formula (1), can be obtained, for example, through the reaction between silyl-modified epoxides and a starter alcohol of any of a very wide variety of origins.

The preparation and the epoxide structural types which can be used are described comprehensively in DE 10 2008 000360.3. The content of the description and of the claims of DE 10 2008 000360.3 (U.S. Application Ser. No.: 12/389, 667) is hereby considered in full to be part of the present disclosure.

The compounds thus prepared impart the synthetic freedom to choose between polyoxyalkylene compounds containing alkoxysilyl groups which contain the hydrolysingly crosslinkable alkoxysilyl functions not only terminally but also in isolation, in block-like accumulation and also randomly inserted into the polyoxyalkylene chain.

As prepolymers it is preferred to use polyether structures of the formula (1) —see also FIG. 1. These structures are composed of linear chains, substituted by alkoxysilyl groups, which, through the choice of the fragments d to j, in accordance with the fragments inserted into the polymer chain by the ring-opening reaction of the reactive components, have a specific high functionalization and so can be customized for different kinds of applications.

formula (1)

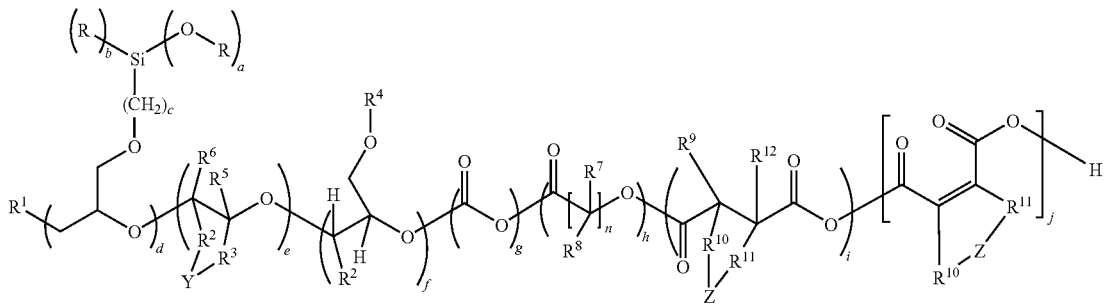

(see also Fig. 1)

The prepolymers thus prepared, especially the alkoxysilyl-modified polyethers of the formula (1), are distinguished by the fact that they can be prepared reproducibly and in a targeted way with respect to structural composition and molar mass. The sequence of monomer units can be varied within wide limits. Epoxide monomers can be lined up in blocks as desired or incorporated randomly into the polymer chain. The fragments inserted into the resulting polymer chain by the ring-opening reaction of the reactive components are freely permutable with one another in their sequence, with the restriction that cyclic anhydrides and also carbon dioxide are present in random insertion, i.e. not in homologous blocks, in the polyether structure.

Where prepolymers used include those which contain more than 1 of the highly functionalized polyalkylene ether fragments attached on the silicon atom, the networks that are present are highly functionalized networks in which polyether chains, each derived from a starter alcohol of the formula (2) $R^1$—H, and which contain in their sequence the freely permutable fragments which have been introduced into the resulting polymer chain by ring-opening reaction of the reactive components, are linked to one another via —$CH_2$—O—$(CH_2)_c$—Si—$(CH_2)_c$—O—$CH_2$— bridges. These are highly complex, highly functionalized structures. Here, as well, it is possible to tailor the functionalities to a desired field of application. The degree of crosslinking and the complexity of the polymer structures obtained increase in line with the epoxy functionality of the silyl monomers. Very particular preference is given to 3-glycidyloxyalkyltrialkoxysilanes as monomers.

The fragments introduced into the resulting polymer chain by the ring-opening reaction, distributed in blocks or at random in the context of the definitions above, may not only be present in the chain of one polyether structural unit but may also be randomly distributed over the multiplicity of polyether structural units that are formed and that are connected to one another via —$CH_2$—O—$(CH_2)_c$—Si—$(CH_2)_c$—O—$CH_2$ bridges. The diversity of the structural variations of the process products therefore does not allow an unambiguous formulized description.

where a is an integer from 1 to 3, preferably 3, b is an integer from 0 to 2, preferably 0 to 1, more preferably 0, the sum of a and b being 3, c is an integer from 0 to 22, preferably from 0 to 18, more preferably from 0 to 6, and in particular is 1 to 3, d is an integer from greater than 1 to 1000, preferably greater than 1 to 100, more preferably greater than 1 to 20, and in particular greater than 1 to 10, e is an integer from 0 to 10 000, preferably 0 to 1000, more preferably 0 to 300, and in particular 0 to 100, f is an integer from 0 to 1000, preferably 0 to 100, more preferably 0 to 50, and in particular 0 to 30, g is an integer from 0 to 1000, preferably 0 to 200, more preferably 0 to 100, and in particular 0 to 70, h, i and j are integers from 0 to 500, preferably 0 to 300, more preferably 0 to 200, and in particular 0 to 100, and with the proviso that the fragments having the indices d to j are freely permutable with one another, i.e. are interchangeable in the sequence within the polyether chain, n is an integer between 2 and 8, and R represents one or more identical or different radicals selected from linear or branched, saturated, singly or multiply unsaturated alkyl radicals having 1 to 20, in particular 1 to 6, carbon atoms or haloalkyl groups having 1 to 20 carbon atoms. Preferably R corresponds to methyl, ethyl, propyl, isopropyl, n-butyl and sec-butyl groups, and especially ethyl or methyl groups, and $R^1$ is a saturated or unsaturated, unbranched or branched radical, or is a polyether radical of the type of an alkoxy, arylalkoxy or alkylarylalkoxy group, in which the carbon chain may be interrupted by oxygen atoms, or $R^1$ is a singly or multiply fused aromatic group to which a phenolic OH group is directly attached.

$R^2$ or $R^3$, and also $R^5$ or $R^6$, is or else are independently of one another each H or a saturated or, where appropriate, singly or multiply unsaturated, including further substituted, optionally monovalent or polyvalent hydrocarbon radical, the radicals $R^5$ or $R^6$ being a monovalent hydrocarbon radical. The hydrocarbon radical may be bridged cycloaliphatically via the fragment Y; Y may be absent, or else may be a methylene bridge having 1 or 2 methylene units; if Y is absent, then $R^2$ or $R^3$ independently of one another are each a linear or branched radical having 1 to 20, preferably 1 to 10, carbon atoms, more preferably a methyl, ethyl, propyl or butyl, vinyl, allyl radical or phenyl radical. Preferably at least one of the two radicals, $R^2$ or $R^3$, is hydrogen. $R^2$—$R^3$ may be a —$CH_2CH_2CH_2CH_2$— group, and hence Y can be a —($CH_2CH_2$—)-group. The hydrocarbon radicals $R^2$ and $R^3$ may in turn be further substituted and carry functional groups such as halogens, hydroxyl groups or glycidyloxypropyl groups.

$R^4$ corresponds to a linear or branched alkyl radical of 1 to 24 carbon atoms or an aromatic or cyclo-aliphatic radical, which where appropriate may in turn carry alkyl groups.

$R^7$ and $R^8$ are independently of one another either hydrogen or alkyl, alkoxy, aryl or aralkyl groups which are copolymerized by ring-opening polymerization to give crosslinkable polyether esters containing alkoxysilane groups.

$R^9$, $R^{10}$, $R^{11}$ and $R^{12}$ are independently of one another each either hydrogen or alkyl, alkenyl, alkoxy, aryl or aralkyl groups. The hydrocarbon radical may be bridged cycloaliphatically or aromatically via the fragment Z, and Z may be either a divalent alkylene radical or alkenylene radical.

The different monomer units both of the fragments having the index numbers d to j and also of the polyoxyalkylene chain of the substituent $R^1$, where present, may be constructed in blocks with one another or else may be subject to a random distribution. The index numbers reproduced in the formulae given here, and the value ranges of the specified indices, are therefore to be understood as the average values of the possible statistical distribution of the structures and/or mixtures thereof that are actually present. This also applies to structural formulae which as such per se are reproduced exactly, such as for formula (1), for example.

As $^{29}$Si-NMR and GPC investigations reveal, the process-related presence of chain-terminal OH groups entails the capacity for transesterification reactions on the silicon atom not only during DMC-catalysed preparation but also, for example, in a downstream process step. In such reactions, formally, the alkyl radical R attached to the silicon via an oxygen atom is replaced by a long-chain modified alkoxysilyl polymer radical. Both bimodal and multimodal GPC plots demonstrate that the alkoxylation products contain not only the untransesterified species, as shown in formula (1), but also those having twice, in some cases three times or even a multiple of the molar mass. Formula (1) therefore provides only a simplified representation of the complex chemical reality.

Accordingly the compositions also comprise compounds in which the sum of the indices (a) plus (b) in formula (1) is on average less than 3, since some of the OR groups can be replaced by silyl polyether groups. The compositions thus include species which are formed on the silicon atom with elimination of R—OH and condensation reaction with the reactive OH group of a further molecule of the formula (1).

The presence of more than one signal in typical $^{29}$Si-NMR spectra of these compounds emphasizes the occurrence of silyl groups with different substitution patterns. The values stated and preferential ranges for the indices a to j are therefore, again, to be understood only as average values across the various, individually unencompassable species.

As starters or starter compounds for the alkoxylation reaction leading to the highly functionalized network-like alkoxysilyl compounds and/or the trialkoxysilyl compounds of the formula (1) it is possible to employ all compounds of the formula (2)

$$R^1\text{—H} \quad (2)$$

(the H belongs to the OH group of an alcohol or of a phenolic compound) alone or in mixtures with one another, that in accordance with formula (2) contain at least one reactive hydroxyl group. $R^1$ corresponds to a saturated or unsaturated, optionally branched radical or represents a polyether radical of the type of an alkoxy, arylalkoxy or alkylarylalkoxy group, in which the carbon chain may be interrupted by oxygen atoms, or $R^1$ denotes a singly or multiply fused aromatic group to which a phenolic OH group is directly attached. The chain length of the polyether radicals which can be used as a starter compound and contain alkoxy, arylalkoxy or alkylarylalkoxy groups is arbitrary. Preferably, the polyether, alkoxy, arylalkoxy or alkylarylalkoxy group contains 1 to 1500 carbon atoms, more preferably 2 to 300 carbon atoms, in particular 2 to 100 carbon atoms.

By starter compounds are meant substances which form the beginning (start) of the polyether molecule (1) under preparation that is obtained by the addition of epoxide-functional monomers. The starter compound used in the process is preferably selected from the group of the alcohols, polyetherols or phenols. As a starter compound it is preferred to use a monohydric or polyhydric alcohol or polyether alcohol $R^1$—H (the H belongs to the OH group of the alcohol or phenol).

As OH-functional starter compounds $R^1$—H (2) it is preferred to use compounds having molar masses of 18 to 10 000 g/mol, more particularly 50 to 2000 g/mol and having 1 to 8, preferably having 1 to 4 hydroxyl groups.

Examples of compounds of the formula (2) include allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, cellulose sugars, lignin or else further hydroxyl-bearing compounds based on natural substances.

It is advantageous as starter compounds to use low molecular mass polyetherols having 1 to 8 hydroxyl groups and molar masses of 50 to 2000 g/mol, which in turn have been prepared beforehand by DMC-catalysed alkoxylation.

Suitability is possessed not only by compounds having aliphatic or cycloaliphatic OH groups but also by any compounds having 1 to 20 phenolic OH functions. These include, for example, phenol, alkyl- and arylphenols, bisphenol A and novolaks.

The various monomer units both of the fragments having the index numbers d to j and also of the polyoxyalkylene chain of the substituent $R^1$, where present, may have a blockwise construction among one another or else may be subject to a statistical distribution.

The index numbers and the value ranges of the stated indices given in the formulae recited here are therefore to be understood as the average values of the possible statistical distribution of the actual structures and/or mixtures thereof that are present. This also applies to structural formulae which as such per se are reproduced exactly, such as, for example, to formula (1).

Depending on epoxide-functional alkoxysilane used and on further monomers employed where appropriate, and also, where appropriate, carbon dioxide, it is possible to prepare alkoxysilyl-modified polyether alcohols (1), and also their mixtures of any desired construction. The alkoxysilane unit in the compound of the formula (1) is preferably a trialkoxysilyl unit.

The alkoxysilyl polymers of the formula (1) can be used alone or in any desired combination, blended with monomeric alkoxysilanes, alkoxysilyl-terminated prepolymers, curing catalysts and also further additives and auxiliaries, which add up in total to 100 parts.

By virtue of their low viscosity, the prepolymers of the invention, more particularly the compounds of the formula (1) containing alkoxysilane groups, can also be used as reactive diluents in combination with other silyl compounds, which are then usually of higher viscosity. The highly trialkoxysilyl-functional prepolymers of the formula (1) raise the network density and so contribute to improving the mechanical properties of the polymer. Moreover, they are also able to influence the viscosity of corresponding prepolymer blends with known alkoxysilanes.

The prepolymers of the invention, particularly the compounds of the formula (1), may be present, for example, in compositions which are used to coat surfaces. The coating may be, for example, an adhesive coating, more particularly a foamed adhesive coating.

The present invention accordingly also provides compositions which comprise the prepolymers of the invention, particularly those of the formula (1). Where these compositions of the invention are to be foamable, they comprise one or more blowing agents which, if appropriate, are formed chemically.

The surfaces to be coated can be coated by known means such as spraying, spreading, dipping, etc. In the process, the surfaces to be bonded are preferably pressed against one another. The optionally foamable mixture (compositions) for producing the adhesive bond is applied preferably from a pressurized can, the formation of foam taking place as a result of the blowing agent which is present in the mixture and which, where appropriate, is also released by chemical reaction.

When the surfaces to be bonded are compressed, the foam structure of the foam is preferably at least largely destroyed. Accordingly the foam, when it has been compressed between surfaces to be bonded, is composed preferably to an extent of less than 60% of its volume, more preferably to an extent of less than 40% of its volume and with particular preference to an extent of less than 20% of its volume, of gas bubbles.

In one preferred embodiment, at least one of the surfaces to be bonded is moistened before the inventive application of the foam. With very particular preference, one of the surfaces to be bonded is moistened, while the foam is applied to the other surface. Subsequently the foam is compressed between the two surfaces.

The invention is based on the surprising discovery that the foam has an amazingly high initial strength when applied to one of the surfaces to be bonded and then compressed by the firm pressing of these surfaces against one another. This distinguishes it quite fundamentally from the sprayable in situ foams described in the prior art, which as foams having a very low density exhibit only a low level of initial mechanical properties. Subject to the proviso of adequate adhesion to the surfaces in question, the initial bond strength of the foam, in contrast, is already so great preferably after just no more than 10 minutes, more preferably after 5 minutes and very preferably after just 2 minutes or 1 minute, that the bond seam can be loaded with a permanent tensile stress (tensile force normal to the bond face) and/or with a shearing stress (tensile force parallel to the bond face) of 500 N/m$^2$, preferably of at least 1000 N/m$^2$ and in particular of at least 1500 N/m$^2$.

The high initial strength of the foam is attributable to a phenomenon which is surprising even to a person skilled in the art. Thus, in contrast to what is the case with conventional silane-crosslinking adhesives, the bond strength of the foam is developed not only through the chemical silane crosslinking. Instead, in addition to this chemical curing process, there is a remarkable physical effect manifested here as well, of a kind which is known otherwise only for contact adhesives, in which the development of strength takes place only as a result of the evaporation of added solvents. In the case of the foam, the function of these solvents is taken on by the blowing agent or mixture of blowing agents. In contrast to what is the case with the contact adhesives which cure only very slowly, however, the blowing agents evaporate, not gradually but in large part suddenly, during the actual foaming of the foamable mixture. In doing so, they foam this mixture to form the foam, which, despite a very high viscosity after the evaporation of the blowing agent, surprisingly remains extremely mobile, with the consequence that the foam can be readily compressed by the pressing of the surfaces to be bonded against one another. When the foam is compressed, a thin, uniform layer of adhesive is formed between the surfaces to be bonded, and the surfaces are effectively wetted, thus allowing an optimum bonding effect to be achieved. This effect is subsequently reinforced further by the chemical curing reactions that take place.

Accordingly, the invention further provides a method of adhesively bonding surfaces, in which a foamable composition is provided which is foamed between the adherend surfaces to form a foam or else in which the foam which can be prepared from the mixture, after foaming, is applied to one of the adherend surfaces or between the adherend surfaces, and the foam is subsequently compressed between the adherend surfaces.

In the context of the present invention, the adherend surface is a surface which is bonded to another surface by means of an adhesive. The surface may optionally contain some residual water or hydroxyl group or other reactive group containing compounds which promote the curing process and give chemical bonding between the surfaces in addition to bonding via adhesive effect.

A further entirely surprising effect, moreover, is the fact that unwanted residues of foam, of the kind that form, for example, when excess amounts of foam are pressed out of the joint when the surfaces to be bonded are compressed, can be removed with comparative ease. Evidently, surface wetting and adhesion of the foam are significantly reduced at sites at which the foam structure is not compressed and hence not destroyed. Evidently the foam formed, independently of its blowing agent and the supply of heat that is necessary where appropriate, retains its mobility, which is based on the fine foam structure, and retains the associated capacity for surface wetting under pressure even when the discharged foam has formed, superficially, a tack-free layer which, however, is broken open when the foam is compressed between the workpieces to be bonded, as a result of which still-uncrosslinked prepolymers are released and are brought into contact with the surfaces to be bonded.

The high initial bond strength of the foam is favoured by a very high foam density.

Accordingly, the invention further provides a foamable composition which comprises (A) the above prepolymers, preferably prepolymers with groups of the general formula (1) and (B) below 15% by weight of blowing agents, based on the overall mixture.

Suitable blowing agents include gases which can be condensed even at a relatively low pressure and which are also used for producing sprayable in situ foams. Common blowing agents are, for example, hydrocarbons having in each case 1 to 5, more particularly 3 to 5 carbon atoms, especially propane-butane mixtures or isobutane, hydrofluorocarbons having 1-5 carbon atoms, e.g. 1,1,1,2-tetrafluoroethane or 1,1-difluoroethane, or dimethyl ether and also corresponding mixtures. The blowing agent content is preferably <10% by weight, more preferably <7% or <5% by weight based on the mixture as a whole. The blowing agent content is preferably not more than 10% by weight, based on the mixture as a whole, more preferably not more than 7% by weight.

Foam formation may also take place without the addition of a blowing agent, on a purely chemical basis, but then preferably in the case of warm or hot curing. In this case, when the adhesive-bonding mixture is warmed up, a blowing agent of low volatility is formed that comprises, for example, alcohols such as methanol or ethanol which have come about from the hydrolysis of the alkoxysilyl group. It is also possible for water or an inert solvent at elevated temperature to serve as blowing agent.

Where coating of a substrate is desired, it is possible in a simple way to dispense with the blowing agent, and where appropriate by addition of solvents or further additives and auxiliaries, to set specifically the physical properties necessary for coatings. The present invention therefore also provides a method of coating or of modifying surfaces wherein a composition which comprises prepolymers, especially those of the formula (1), is applied to the surface to be treated and is cured.

Catalysts which can be used for crosslinking or polymerizing the prepolymers of the invention, especially the polyetherols of the formula (1) bearing alkoxysilyl groups, are the known polyurethanization, allophanatization or biuretization catalysts that are known per se to a person skilled in the art. They include compounds such as, for example, the zinc salts, zinc octoate, zinc acetylacetonate and zinc 2-ethylcaproate, or tetraalkylammonium compounds such as N,N,N-trimethyl-N-2-hydroxypropylammonium hydroxide, N,N,N-trimethyl-N-2-hydroxypropylammonium 2-ethylhexanoate or choline 2-ethylhexanoate are used. Preference is given to the use of zinc octoate (zinc 2-ethylhexanoate) and of tetraalkylammonium compounds, more preferably to that of zinc octoate. As catalysts it is additionally possible to use the organotin compounds that are customarily used, such as dibutyltin dilaurate, dioctyltin dilaurate, dibutyltin diacetylacetonate, dibutyltin diacetate or dibutyltin dioctoate etc., for example. Furthermore, it is also possible for bismuth catalysts, such as the Borchi catalysts, titanates, e.g. titanium(IV) isopropoxide, iron(III) compounds, e.g. iron(III) acetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]-non-5-ene, N,N-bis(N,N-dimethyl-2-aminoethyl)methylamine, N,N-dimethylcyclohexylamine, N,N-dimethylphenylamine, N-ethylmorpholine etc. to be used. Organic or inorganic Brönsted acids as well, such as acetic acid, trifluoroacetic acid or benzoyl chloride, hydrochloric acid, phosphoric acid, its monoesters and/or diesters, such as butyl phosphate, (iso) propyl phosphate, dibutyl phosphate, etc. are suitable catalysts. It will be appreciated that combinations of two or more catalysts can also be used.

More recently, however, the toxic properties of organotin catalysts in particular have brought them into disrepute. Furthermore, the use of such catalysts generally rules out the presence of ester bonds in these systems, since the catalysts accelerate ester cleavage and therefore may induce changes in the properties of the system. Consequently, the producer of such systems, for example the producer of adhesive or sealant systems for the DIY sector, is restricted in their freedom to formulate. DE 102004018548 therefore describes the use of curable compositions which comprise at least one silyl-terminated polymer and at least one photolatent base, the silyl-terminated polymer being composed of a linear or branched base polymer radical which is free from silane groups but carries terminal silane groups. Preference is given in particular to silyl-terminated organic polymers and/or silyl-terminated silicone polymers.

The corresponding organic polymers or silicone polymers of DE 10 2004 018 548 contain no silane groups within their main chain or main chains, but instead only at the respective ends of the polymer chains. Thus in a linear polymer only the two ends of the polymer are silyl-terminated; such a polymer is referred to below as divalent. When a polymer prepared starting from glycerol, for example, is used, it is possible, on the basis of the three hydroxyl groups of the glycerol, for three independent silane-free polymer strands to form, with a silane group terminus being located possibly in turn only on the end of the strand. A thus-branched polymer with three ends is referred to below as trivalent. Similarly, polymers having four ends are referred to as tetravalent. The absence of further silane groups in the structures of DE 10 2004 018 548 within the base polymer chain, in the form of side groups, for example, limits the crosslinking density and also the mechanical properties after curing. In the case of crosslinking via side groups, the adhesion may be increased, owing to additional anchor groups on the respective substrate, or else may be tailored to the application through an appropriate choice of silyl functionalization. Suitable selection of structure places the curing time window, therefore, at the discretion of the user; at the same time it is also possible in this way to produce compositions having outstanding storage stability in a targeted way.

The (curable) compositions of the invention may also comprise what are referred to as photolatent bases as catalysts, as described in WO 2005/100482. Photolatent bases are preferably organic bases having one or more basic nitrogen atoms, which to start with are present in a blocked form and which release the basic form only after irradiation with UV light, visible light or IR radiation through cleavage of the molecule.

A photo-latent base is to be understood preferably as an organic base with one or more alkaline nitrogen atoms, which are present at first in a blocked form and only after irradiation with UV light, visible light or IR radiation by splitting the molecule the basic form sets free.

The choice of the photo-latent base depends on the one hand on the silane-terminated polymers which can be crosslinked, on the other hand on the further facultative components of the composition. If the cross-linking reaction requires a strong base, then a photo-latent and/or photo-unstable base needs to be selected, that will set free a strong base free while irradiated. If the composition contains further UV absorbing components, then a photo-latent base is preferably selected, in which the activation wavelength, that means wavelength of the splitting off of the free base, does not interfere with the other UV absorbing components.

As the time of the irradiation can be selected freely and thus the contact of the curable polymers with the free base is assignable by the user, the beginning of curing is free adjustable and in sole discretion of the user.

In principle all photo-latent bases can be used as protected catalysts. Thus for example also o-nitrobenzyl oxycarbonyl amine, benzoin carbamate, dimethylbenzoyl oxycarbonyl amine, formanilid derivatives or O-acyloxime are applicable. Such compounds have been cited for example by Cameron et al. in the J. Am. Chem. Soc. 118 (1996) 12925, J. Chem. Soc. Perkin Trans. I (1997) 2429 and J. Org. Chem. 55 (1990) 5919, Nishikubo et al. in the Polym. J. 29 (1997) 450 and Polym. J. 25 (1993) 365, as well as Ito et al. in the J. Poly. Sci. Part A: Chem. 32 (1994) 2177 described.

However the only recently described photo-latent tertiary amines and amidines are preferred. These are to be found for example in the published international patent application WO 03/014226 A1 or in the publication "New latent amines for the coatings industry" from T. Young, K. Dietlinker and J. Benkhoff (color & lacquer 109 (10/2003) 34).

Examples of suitable bases are among other things tertiary amines and amidines, like diazabicyclooctan, N-alkylmorpholines, tetramethylguanidin (TMG), diazabicyclononen (DBN), diazabicycloundecene (DBU) and Imidazol.

Particularly preferred amidines are photo-unstable diazabicyclononane, in particular 5-benzyl-1,5-diazabicyclo[4.3.0]nonan, whereby the 5-benzyl-redidue may be single or several times substituted. Suitable substituents at the 5-benzyl residue are for example halogen atoms, like chlorine or bromine, alkyl residues, like methyl, ethyl, or propyl, nitrile residues, nitro groups, alkoxy groups, like methoxy or ethoxy or to the 5-benzyl residue condensed aromatic residues, as for the example a 5-(benzyl) residue, 5(naphth-2-ylmethyl) residue or a 5-(anthracen-9-yl-methyl) residue. Also for example a 5-(anthrachinon-2-yl-methyl) residue can replace the 5-benzyl residue. Apart from the possible substitutions at the 5-Benzyl-Rest the diazacyclononan residue may be further substituted, as for example in 5-benzyl-2-methyl-1,5-diazabicyclo[4.3.0]nonan.

Beside the photo-unstable diazabicyclononane, also the possibility exists of using photo-unstable Diazabicycloundecane as for example 8-benzyl-1,8-diazabicyclo[5.4.0]undecane and its derivatives. The 8-Benzyl residue can be further substituted or replaced similar to the 5-benzyl-residue of the 5-benzyl-1,5 diazabicyclo-[4.3.0]-nonans. The possibility of a further substitution at the Diazabicyclononane residue exists here also.

Also photo-latent bases can be used, which contain two blocked bases in a molecule. A representative example of this kind is for example the 1,4-bis(1,5-diazabicyclo[4.3.0]nonanylmethyl)benzene.

The choice of photolatent base is dependent on the one hand on the silane-terminated polymers to be crosslinked and on the other hand on the other optional constituents of the composition. Where the crosslinking reaction requires a strong base, it is necessary to select a photolatent or photolabile base which releases a strong base when irradiated. Where the composition comprises further UV-absorbing constituents, it is preferred to select a photolatent base whose activation wavelength, i.e. whose wavelength of elimination of the free base, does not interfere with the other UV-absorbing constituents.

Since the point in time at which irradiation is carried out is freely selectable, and therefore the contact of the curable polymers (prepolymers) with the free bases can be determined by the user, the beginning of curing can be placed at the discretion and desire of the user. The synthesis of the abovementioned photolatent bases is described in sources including WO 03/033500 A1. Where appropriate, a photosensitizer is used as an accompaniment, since it allows the quantum yield in the case of photoactivation to be improved.

The catalyst or photolatent base is employed in amounts of 0.001% to 5.0% by weight, preferably 0.01% to 1.0% by weight and with particular preference 0.05% to 0.5% by weight, based on the solids content of the process product.

The catalyst or photolatent base can be added in one portion or else portionally or else continuously. It is preferred to add the whole amount in one portion. As further components, the compositions may preferably comprise further, usually monomeric, silanes, fillers, solvents, foam stabilizers, and also catalysts for accelerating the curing of the foam.

Further silanes used may be in principle all silanes, preferably those with hydrolysable alkoxy groups, and in particular with those compounds as described in DE 10200605415 or WO 2005/003201.

Besides the silanes, the compositions comprise as further components and auxiliaries, often fillers. The fillers in this case lead to a considerable improvement in the properties of the resulting blends. The tensile strength in particular, and the elongation at break as well, can be increased considerably through the use of suitable fillers. Examples of common fillers include calcium carbonate, fumed silica and carbon black. The various fillers are often also employed in combination. Suitable fillers in this context include all materials of the kind widely described in the prior art. The fillers are used preferably in a concentration of 0% to 90% by weight based on the completed mixture, with concentrations of 5% to 70% by weight being particularly preferred.

Moreover, the compositions of the invention may also comprise further organic substances, preferably liquids and solvents. These solvents serve, for example, to lower the viscosity of the uncrosslinked mixtures. Suitable solvents include in principle all solvents and also solvent mixtures. Solvents used are preferably compounds which possess a dipole moment. Particularly preferred solvents possess a heteroatom with free electron pairs which are able to enter into hydrogen bonds. Preferred examples of such solvents are ethers such as tert-butyl methyl ether, esters, such as ethyl acetate or butyl acetate and also alcohols, such as methanol and ethanol for example, and also the various regioisomers of propanol and butanol, or else glycol types selected specifically for the particular application.

In order to achieve rapid curing at room temperature, particularly of the foams, it is possible where appropriate to add a curing catalyst, for example, from the group of the aforementioned polyurethanization, allophanatization or biuretization catalysts, acids, bases or photolabile compounds. Foam stabilizers which can be used are the same compounds also used in conventional in situ foams. A wide selection thereof is available commercially and they are widely described in the literature.

Furthermore, the compositions may also comprise auxiliaries known per se, such as water scavengers, adhesion promoters and/or reactive diluents that differ from the components, and also plasticizers (e.g. phthalates, benzoates, phosphate plasticizers), thixotropic agents, fungicides, flame retardants, pigments, etc. Light stabilizers, antioxidants, free-radical scavengers and further stabilizers can be added to the compositions as well. Additions of this kind are generally vital to producing the particular desired profiles of properties, both in the uncrosslinked mixtures and in the cured masses.

For the compositions of the invention there exist countless different applications in the field of adhesives, sealants, binders and/or joint-sealants. They are suitable for countless different substrates, such as mineral substrates, metals, plastics, glass, ceramic, wood, wood-based materials, natural fibre or else cork, etc. for example. In principle, the compositions and/or the foams produced from them are suitable for adhesively bonding any article. In particular, however, they are highly suitable when the surfaces to be bonded are uneven or else where small fibres or particles and also cork, for example, are to be joined with one another to form a composite material. This is the case, for example, when adhesively bonding fracture sites which, as a result of splintering or warping of materials, no longer fit exactly over one another, or else when adhesively bonding skirting boards, coving or other ornamental trims to an uneven wall surface. Here the foams possess the advantage that they are able to provide effective filling even of cavities.

The compositions of the invention are used preferably as foamable adhesives, more preferably as 1-component foamable adhesives which cure on contact with atmospheric moisture and/or water.

Accordingly, the invention further provides composite materials such as, for example, wood composites, such as MDF board (medium-density fibreboard), chipboard, cork articles and laminated articles which are produced using the optionally foamable prepolymers and compositions thereof.

The invention further provides adhesives, sealants, binders and/or joint-sealants comprising the prepolymers and compositions of the invention. These as-claimed adhesives, sealants, binders and/or joint-sealants are capable of bonding and/or sealing and/or joining different substrates to one another. Furthermore, the adhesives may also be foamable.

BRIEF DESCRIPTION OF THE DRAWINGS

FIG. 1 is a larger view of the structure represented by formula (1).

The compositions of the invention (or adhesives) and their use are described by way of example below, without any intention that the invention should be confined to these exemplary embodiments. Where reference is made below to ranges, general formulae or classes of compound, this is intended to encompass not only the corresponding ranges or groups of compounds that are explicitly mentioned but also all sub-ranges and sub-groups of compounds which may be obtained by extraction of individual values (ranges) or compounds. Where documents are cited in the context of the present description, the intention is that their content should belong fully to the disclosure content of the present invention.

Further embodiments of the invention will become apparent from the claims.

In the examples given below, the present invention is described by way of example, without any intention that the invention, whose breadth of application is a product of the claims and the description as a whole, should be confined to the embodiments specified in the examples.

Unless indicated otherwise, all amounts data and percentage data in the examples below are given by weight, all pressures are 0.10 MPa (abs.) and all temperatures are 20° C.

The tack-free time is occasionally stated as a measure of the reactivities of the prepolymers. The tack-free time is the period of time which elapses after the prepolymer has been applied in the air until the polymer surface is cured to an extent such that, after contact between this surface and a pencil, there is neither polymer mass left adhering to the pencil, nor stringing.

EXPERIMENTAL SECTION

The invention is further described by the following non-limiting examples which further illustrate the invention, and are not intended, nor should they be interpreted to, limit the scope of the invention.

In the examples below, the following polyethers containing trialkoxysilyl groups were used, prepared in accordance with the as yet unpublished specification DE 10 2008 000360.8 by the process principle of DMC-catalysed alkoxylation from 3-glycidyloxypropyl-triethoxysilane or 3-glycidyloxypropyltrimethoxysilane:

Trialkoxysilyl Polyether 1:
  Low molecular mass, colourless and low viscosity polyether with an average molar mass of approximately 1300 g/mol and four-fold trialkoxysilane functionality.
Chemical construction: Tripropylene glycol+4 mol of 3-glycidyloxypropyltriethoxysilane (Dynasylan® GLYEO) from Evonik Degussa GmbH Trialkoxysilyl Polyether 2:
  Low molecular mass, colourless and low viscosity polyether with an average molar mass of approximately 1200 g/mol and four-fold trialkoxysilane functionality.
Chemical structure: Tripropylene glycol+4 mol of 3-glycidyloxypropyltrimethoxysilane (Dynasylan® GLYMO) from Evonik Degussa GmbH Trialkoxysilyl Polyether 3:
  High molecular mass, almost colourless and low viscosity polyether with an average molar mass of approximately 9000 g/mol with block-like structure and 4-fold trialkoxysilane functionality.
Chemical structure: Dipropylene glycol+135 mol of propylene oxide+4 mol of 3-glycidyloxypropyl-triethoxysilane (Dynasylan® GLYEO)

Trialkoxysilyl Polyether 4:
  High molecular mass, almost colourless and low viscosity polyether with an average molar mass of approximately 6400 g/mol with block-like structure and 8-fold trialkoxysilane functionality.
Chemical structure: Tripropylene glycol+4 mol of 3-glycidyloxypropyltriethoxysilane (Dynasylan® GLYEO)+70 mol of propylene oxide+4 mol of 3-glycidyloxypropyl-triethoxysilane (Dynasylan® GLYEO)

1. Preparation of Adhesive Foams:

Example 1.1

A homogeneous curable mixture is prepared by stirring 200 g of trialkoxysilyl polyether 1, 20 g of a 10% strength by weight solution of methanesulphonic acid in polypropylene glycol with an average molar mass of 1100 g/mol and 40 g of a polypropylene glycol with an average molar mass of 25 000 g/mol together at 30° C. until a clear solution is obtained. A mixture of this kind is stable on storage at room temperature for several months in the absence of moisture.

50 g of this mixture are introduced together with 1 g of foam stabilizer Tegostab® B 8526 (Evonik Goldschmidt GmbH) in a glass pressure vessel with a volume of 100 ml and then this initial charge is charged with 5 g of butane as blowing agent. After thorough shaking for commixing, a homogeneous and virtually colourless transparent mixture is thus obtained. Via an adapter tube mounted on the valve and of the type common for in situ foams, the pressurized, moisture-curing mixture is applied at room temperature as a foam to two specimens of wood, with a bond face measuring 3 cm×9 cm. One of the blocks of wood is then adhered to a cleaned surface coated with conventional wall paint, the other to a wood surface. The bond faces are pressed firmly against one another for a number of seconds, during which the foam is compressed. After 30 minutes the bond faces are permanently loaded with a tensile stress of 5 N. Curing after this time has proceeded to a point where the adhesion to the respective substrate is good enough that the adhesive bonds do not detach from the substrate and the cured foam withstands the mechanical load.

Example 1.2

30 g of the curable prepolymer mixture described in Example 1.1 and 1 g of foam stabilizer Tegostab® B 8870 (Evonik Goldschmidt GmbH) are introduced into a glass pressure vessel with a volume of 100 ml and then this initial charge is admixed with 7 g of butane as blowing agent. The low-viscosity mixture, which is homogeneous after shaking, is subsequently discharged as a foam via an adapter tube, by opening of the valve located on the pressure vessel. After 5 minutes at room temperature, the foam is tack-free and after 12 hours it is cured.

Example 1.3

A homogeneous curable mixture is prepared by stirring 225 g of trialkoxysilyl polyether 2, 6 g of dibutyltin dilaurate and 75 g of a polypropylene glycol with an average molar mass of 25 000 g/mol together at 30° C. until a clear solution is obtained. Such a mixture is stable on storage over several months at room temperature in the absence of moisture.

30 g of this mixture and 1 g of foam stabilizer Tegostab® B 8870 (Evonik Goldschmidt GmbH) are weighed out into a pressure vessel with a volume of 100 ml. This is followed by the addition of 5 g of butane as blowing agent. After thorough shaking for commixing, a homogeneous, pale liquid of low viscosity is produced.

Subsequently, by opening of the valve located on the pressure vessel, the composition is discharged as a foam, which is tack-free within 5 minutes at room temperature and after 12 hours is cured.

2. Production of Coatings:

Example 2.1

A homogeneous curable mixture is prepared by stirring 225 g of trialkoxysilyl polyether 3, 6 g of dibutyltin dilaurate and 75 g of a polypropylene glycol with an average molar mass of 25 000 g/mol together at 30° C. until a clear solution is obtained. Such a mixture is of low viscosity and stable on storage for several months at room temperature in the absence of moisture.

The mixture is filled into a rectangular casting mould, together giving a layer thickness of 3 mm. The system begins to cure at room temperature in contact with atmospheric moisture (relative humidity 60%). A polymer coating is formed which becomes increasingly viscous over time and which ultimately solidifies, and after 48 hours has cured right through.

Example 2.2

A curable mixture is prepared by stirring 200 g of trialkoxysilyl polyether 4 and 20 g of a 10% strength by weight solution of methanesulphonic acid in polypropylene glycol with an average molar mass of 1100 g/mol together at 30° C. until a clear solution is obtained. Subsequently 10 g of a fumed silica (Aerosil® R 972 from Evonik Degussa GmbH) are added and the mixture is stirred for 3 hours until a homogeneous composition is formed.

As above, in Example 2.1, the mixture is poured into a rectangular mould, together giving a layer thickness of 3 mm. The system begins to cure at room temperature in contact with atmospheric moisture (relative humidity 60%). A polymer coating is formed which becomes increasingly viscous over time and which ultimately solidifies, and after 48 hours has cured right through.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:
1. A foamable composition comprising:
one or more blowing agents; and
a prepolymer comprising:
    at least one —OH chain end which is reactive towards epoxide groups; and
    more than one alkoxysilyl function per each —OH chain end which is reactive towards epoxide groups;
    wherein the prepolymer is prepared on the basis of a starter molecule with an active hydroxyl group;
    wherein the prepolymer is a polyoxyalkylene which is obtained by alkoxylation of epoxide-functional alkoxysilanes by double metal cyanide (DMC) catalysis; and
    wherein the prepolymer is a liquid alkoxysilane polyether of the formula (1):

formula (1)

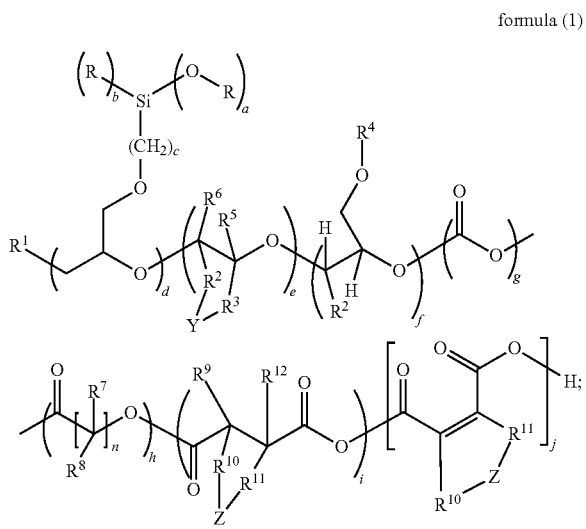

wherein:
    a is an integer from 1 to 3; and
    b is an integer from 0 to 2;
    where the sum of a and b is 3;
wherein:
    c is an integer from 0 to 22;
    d is an integer from greater than 1 to 1,000;
    e is an integer from 0 to 10,000;
    f is an integer from 0 to 1,000;
    g is 0;
    h is an integer from 0 to 500;
    i and j are 0; and
    n is an integer between 2 and 8;
    with the proviso that the fragments having the indices d to j are freely permutable with one another, i.e. are interchangeable in the sequence within the polyether chain; and wherein:
R represents one or more identical or different radicals selected from linear or branched, saturated, singly or multiply unsaturated alkyl radicals having 1 to 20 carbon atoms or haloalkyl groups having 1 to 20 carbon atoms; and wherein:
$R^1$ represents a saturated or unsaturated, unbranched or branched radical or a polyether radical of the type of an alkoxy, arylalkoxy, or alkylarylalkoxy group, in which the carbon chain may be interrupted by oxygen atoms; or
$R^1$ is a singly or multiply fused aromatic group to which a phenolic OH group is directly attached; and wherein:
$R^2$ and $R^3$, independently of one another, are each:
H; or
a saturated or unsaturated, monovalent or polyvalent hydrocarbon radical; or
a polyvalent hydrocarbon radical which is bridged cycloaliphatically via the fragment Y; and
Y may be absent, or else is a methylene bridge having 1 or 2 methylene units;
where, if Y is absent, then $R^2$ or $R^3$ independently of one another are each a linear or branched radical having 1 to 20 carbon atoms; and
where, if $R^2$—$R^3$ is a —$CH_2CH_2CH_2CH_2$— group, then Y is a —$(CH_2CH_2)$— group, and the hydrocarbon radicals $R^2$ and $R^3$ may in turn be further substituted and carry functional groups; and wherein:
$R^5$ and $R^6$, independently of one another, are each H, or a saturated or unsaturated, monovalent hydrocarbon radical;
$R^4$ is a linear or branched alkyl radical of 1 to 24 carbon atoms, or an aromatic or cycloaliphatic radical which if appropriate may, in turn, carry alkyl groups;
$R^7$ and $R^8$ are independently of one another either hydrogen, or an alkyl, alkoxy, aryl, or aralkyl group which is copolymerized by ring-opening polymerization to give crosslinkable polyether esters containing alkoxysilane groups;
$R^9$ and $R^{12}$ are independently of one another either hydrogen, or an alkyl, alkenyl, alkoxy, aryl, or aralkyl group;
$R^{10}$ and $R^{11}$ are independently of one another either hydrogen, or an alkyl, alkenyl, alkoxy, aryl, or aralkyl group, it being possible for the hydrocarbon radical to be bridged cycloaliphatically or aromatically via the fragment Z; and
Z may be absent, or else is a divalent alkylene radical or alkenylene radical.

2. The foamable composition according to claim 1;
wherein the prepolymer contains more than one trialkoxysilyl function per each —OH chain end which is reactive towards epoxide groups.

3. The foamable composition according to claim 1;
wherein the prepolymer is configured as a coating composition, a binder, and/or an adhesive bonding composition, including, where appropriate, a foamable adhesive bonding composition.

4. The foamable composition according to claim 1;
wherein the alkoxysilane polyether of formula (1) is a trialkoxysilane polyether.

5. A method of adhesively bonding surfaces or three-dimensional composite materials, comprising:
a step of:
foaming the foamable composition according to claim 1 between the adherend surfaces to form a foam; or
applying a foam prepared from the foamable composition according to claim 1, after foaming, to one of the adherend surfaces or between the adherend surfaces; and
subsequently compressing the foam between the adherend surfaces.

6. A method of coating or of modifying surfaces, comprising:
applying the foamable composition according to claim 1 to the surface to be treated; and
curing the applied composition.

7. The method according to claim 5;
wherein the foamable composition further comprises a component selected from the group consisting of further silanes, fillers, solvents, foam stabilizers, and catalysts for accelerating the curing of the foam.

8. The foamable composition according to claim 1, further comprising:
a component selected from the group consisting of further silanes, fillers, solvents, foam stabilizers, and catalysts for accelerating the curing of the foam.

9. A polymeric material, if appropriate with a foam-like structure;
obtained by free or catalytically induced curing of the foamable composition according to claim 1.

10. A composite material produced utilizing the foamable composition according to claim 1.

11. An adhesive, sealant, binder, and/or joint sealant comprising:
the foamable composition according to claim 1.

12. The adhesive, sealant, binder and/or joint-sealant according to claim 11;
wherein different substrates can be adhesively bonded and/or sealed and/or joined therewith.

13. The adhesive according to claim 11;
wherein the adhesive is a foamable adhesive.

14. The foamable composition according to claim 1,
wherein a formation of the foamable composition is chemically formed.

* * * * *